Feb. 13, 1934.    R. STOVER    1,946,821
MECHANISM OPERATOR
Original Filed Feb. 23, 1929    3 Sheets-Sheet 1
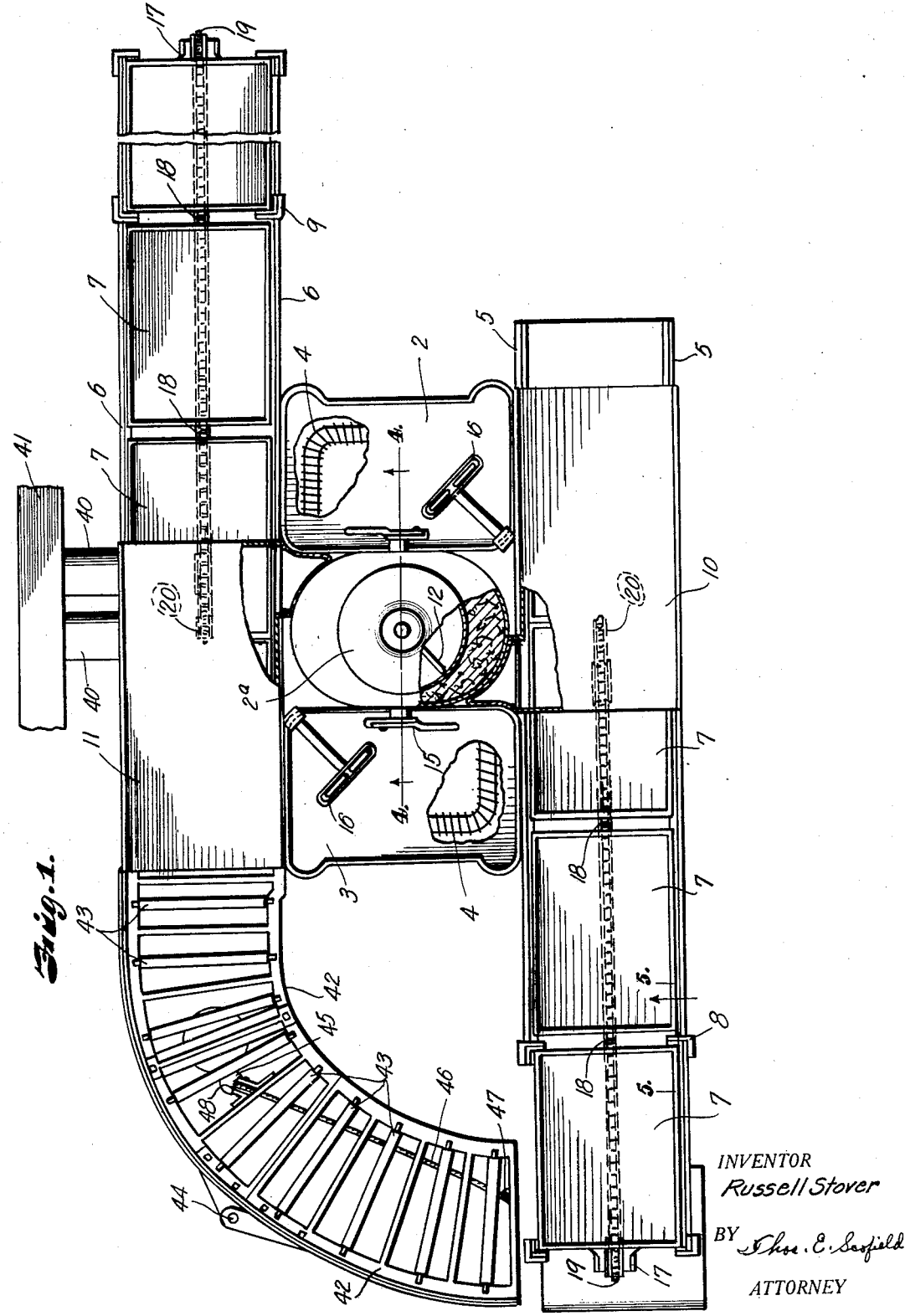
INVENTOR
Russell Stover
BY Thos. E. Scofield
ATTORNEY Feb. 13, 1934.   R. STOVER   1,946,821
MECHANISM OPERATOR
Original Filed Feb. 23, 1929   3 Sheets-Sheet 2
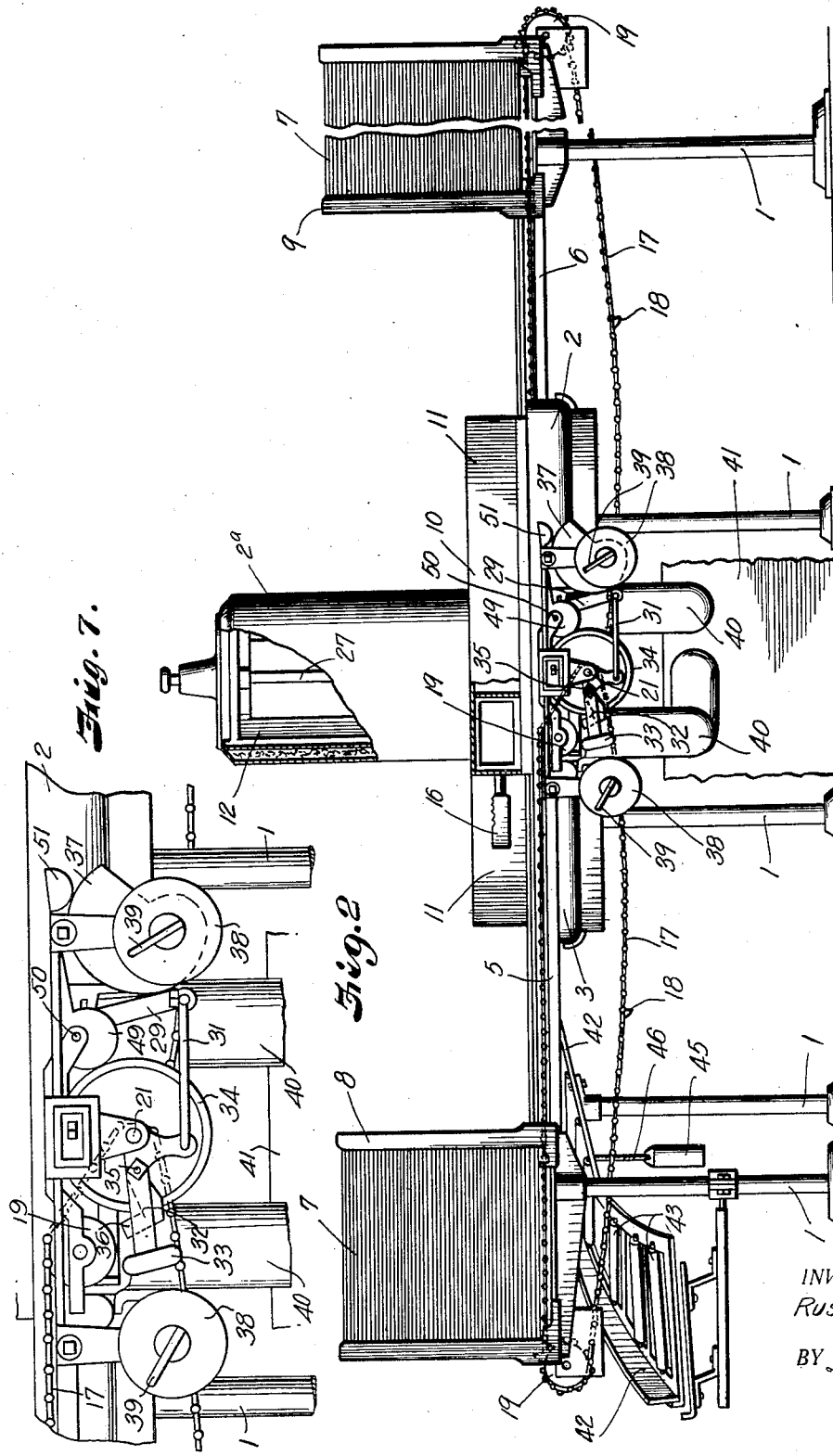
INVENTOR
Russell Stover
BY Thos. E. Scofield
ATTORNEY Feb. 13, 1934.    R. STOVER    1,946,821
MECHANISM OPERATOR
Original Filed Feb. 23, 1929    3 Sheets-Sheet 3
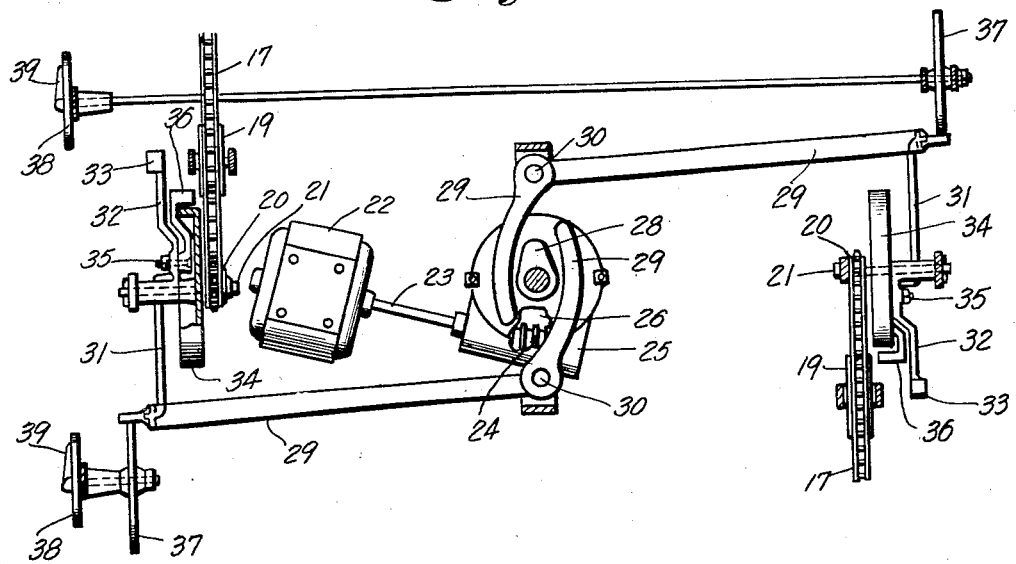
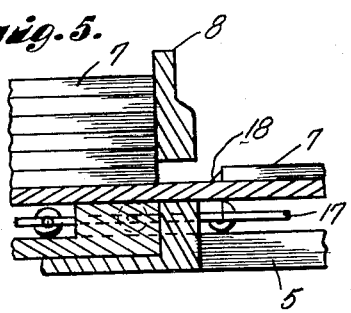
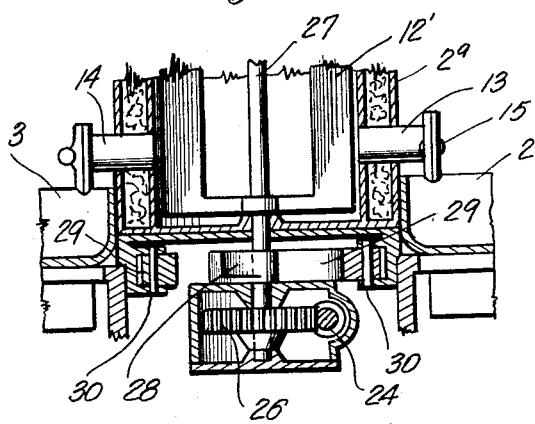
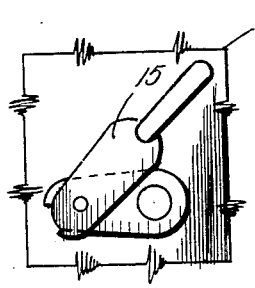
INVENTOR
Russell Stover
BY Thos. E. Scofield
ATTORNEY Patented Feb. 13, 1934

1,946,821

UNITED STATES PATENT OFFICE 1,946,821

MECHANISM OPERATOR

Russell Stover, Chicago, Ill.

Original application February 23, 1929, Serial No. 342,278. Divided and this application July 24, 1930. Serial No. 470,413

2 Claims. (Cl. 74—53)

This invention relates to mechanism operators and more particularly to candy machine operators, although certain features thereof may be employed with equal advantage for other purposes.

It contemplates more especially the provision of power operators for actuating and controlling the intermittent and timed operation of instrumentalities primarily adaptable for coating edible centers, though it is utilizable with other machines.

This application is a division of application serially numbered 342,278 filed February 23, 1929.

Fig. 1 is a plan view of the mechanism.

Fig. 2 is a front elevational view.

Fig. 3 is an enlarged detail plan view of the driving mechanism.

Fig. 4 is a fragmentary vertical section taken along the line 4—4 in Fig. 1.

Fig. 5 is a view taken along the line 5—5 in Fig. 1.

Fig. 6 is a detail of the valve for the spout by means of which dipping material is removed from the reservoir.

Figure 7 is an enlarged front view in elevation of the operating mechanism shown in Figure 3.

Referring to the drawings, the mechanism is supported by any suitable type of standards or legs 1. In the center of the machine is an insulated kettle or reservoir 2ª which is electrically heated, the heat supply being thermostatically controlled by mechanism omitted for the sake of simplicity.

Arranged on opposite sides of the reservoir are dipping pans 2 and 3 also electrically heated by heating elements shown diagrammatically at 4.

On the front and rear of the machine are rails or slides 5 and 6. These rails support trays 7 which are placed on the rails 5 by means of a tray rack or magazine 8, and on the rails 6 at the rear of the machine from the magazine 9. Adjacent each operator or dipper are cooling tunnels 10 and 11. The operator using the pan 2 places the dipped goods upon the trays 7 which slide upon the rails 6 and pass through the cooler 11, while the dipper facing the pan 3 places dipped goods upon the trays which ride the rails 5 and 6 through the cooler 10.

Explaining now the operation and describing first the dipping mechanism, chocolate or other material to be used as a dipping substance is placed in the kettle or reservoir 2ª which, as stated, is heated at a uniform temperature to maintain the substance at the proper temperature and consistency. Within the reservoir is an agitator 12 rotated by mechanism hereinafter explained. The agitation of the material maintains it at a uniform and desired temperature throughout.

At opposite sides and near the bottom of the reservoir are spouts 13 and 14 controlled by valves 15, the details of which are shown in Fig. 6. By means of these valves the dipping substance is withdrawn into the pans 2 and 3. As suggested, the operators sit facing the dipping pans. Candy centers are supplied to the dippers in any convenient manner by a separate employee standing in front of the cooler 10. The dippers then immerse the centers in the coating substance and deposit or place the dipped goods onto the trays 7. Adjacent the reservoir and above the pans 2 and 3 are combination hand wipers and melting troughs 16. The front edges of the wipers are shaped to conform with the contour of the fingers of the dipper so that the excess coating substance may be scraped from the hands and fingers at intervals during the dipping operation when necessary. The wipers are preferably heated by electrical heating elements not shown, to facilitate removing of the excess coating substance which clings to the fingers of the dipper and affects the facility with which the dippers work.

Describing now the magazines and conveyor mechanism, in the magazines 8 and 9 are placed a plurality of trays 7. Beneath the magazines pass conveyor chains 17 upon which are mounted upstanding lugs 18. The trays are picked up by the sprocket chain due to the contacting of lug 18 against the rear of the tray which slides the tray out from under the stack and carries it along the rails 5 and 6 to a position accessible to the operator. The magazine standards 8 which hold the front of the trays have slotted openings as shown in Fig. 5 to permit a single tray to be removed from the stack by the conveyor chain. These slotted openings are limited in height to hold the trays above which are fed down by gravity. The rate of travel of the trays will be explained in connection with the description of the driving mechanism.

The conveyor chains ride over the sprocket wheels 19 pivoted in the frame of the machine. The chains are driven from small sprocket wheels 20 mounted upon the shafts 21. As the driving mechanism for the two conveyor chains is identical, it will be sufficient to describe then simultaneously.

With reference to the driving mechanism, a motor 22 is hung on the frame beneath the reservoir and through a drive shaft 23 rotates the worm gear 24 within the oil packed casing 25. This worm meshes with a horizontally positioned gear 26 shown in Fig. 4, which is mounted upon the vertical shaft 27. This vertical shaft extends through and bears in the bottom of the reservoir and carries the agitator 12, which creates a thorough mixing and turbulence of the coating substance in the reservoir. Above the gear 26 there is mounted upon the shaft 27 a cam 28 which in its rotation contacts the crank arms 29, the latter being pivoted at 30 beneath the reservoir. The outer extremities of these crank arms 29 have link connections 31 with the pivoted crank arms 32 which are weighted at their outer free ends by weight members 33. The purpose of the weights 33 is to return the crank arms 29 to position after they have been oscillated by the cam 28. The crank arms 32 are pivoted and freely rotatable upon the shafts 21 which carry the sprocket wheels 20. Fixedly mounted to the shafts 21 are drive wheels 34 shown in Figs. 2 and 3. On the weighted free ends of the crank arms 32 and intermediate the pivots 21 and weights 33 are pivoted at 35 friction shoes or drags 36. The free outer ends of these friction shoes are adapted to contact the circumference or outer peripheries of the drive wheels 34. This gripping of the drive wheels by the friction shoes occurs when the links 31 move the crank arms 32 about their pivot points 21 in response to the movement of the arms 29, the latter being an oscillating movement resulting from contact with the cam 28. In other words, the contacting of the cam 28 oscillates the crank arms 29 which in turn through the links 31 rotate the crank arms 32 through a sector of a circle on their pivots 21. The movement transmitted to the cranks 32 is an oscillating movement. The advancing period raises the weighted free ends 33 of the crank arms 32 which in turn releases and raises the shoes or drags 36 from their friction engagement or contact with the rim of the drive wheel during the receding movement of the crank arms 32. At the return period of the oscillation the crank arm 32 is rotated in the opposite direction during which the shoe 36 frictionally engages the drive wheel, rotating the wheel and sleeve integral therewith on the shaft 21. This rotative movement of the drive wheel is transmitted to the conveyor chains 17 through the sprockets 20 and the trays riding upon the rails 5 and 6 are moved correspondingly a short distance in their travel.

On the opposite side of the drive wheel from the shoes or drags 36 are positioned cam members 49 pivoted at 50 on the frame and having weighted members 51 which hold the cam brakes in contact with the drive wheel. The pivots of the cams are slightly offset in order to pinch the surface of the drive wheels and prevent their being rotated in but one direction. In other words, the cams function as brakes upon the drive wheels, keeping the slack out of the conveyor chains and preventing the drive wheels from rotating counter-wise to the normal travel which drives the conveyor chains.

To regulate the rate of travel of the trays there are positioned against the outer ends of the crank arms 29, cam-shaped disks 37 by means of which the oscillations of the arms 29 are limited. Calibrated dials 38 positioned on the front of the machine have adjustable indicating hands or levers 39 by means of which the rapidity of travel or advancement of the trays is accurately regulated through an innumerable series of variations of speed. In other words, the speed may be regulated from practically no perceptible movement to a maximum rate controlled by the limit of the dipper's capability.

The rails 5 and 6 extend through coolers 10 and 11 which are positioned adjacent the reservoir. These cooling tunnels are supplied with cool air through ducts or pipes 40 shown in Fig. 1. The pipes 40 are leads from a larger air duct 41.

The trays fed from the magazines 8 move along the rails 5 and are used by the operator who faces the dipping pan 3. The trays after passing the operator continue with the dipped goods thereon through the cooler 10 and are removed from the opposite end to suitable storage racks. The trays fed from the magazine 9 move along the rails 6 and are used by the operator dipping from the pan 2. These trays pass through the cooler 11 after which they slide down a semicircular inclined chute 42 upon which are mounted the rollers 43. At the extremity of the inclined chute is a small delivery platform shown in Figs. 1 and 2 of the drawings. A portion of the inclined chute is pivoted as a gate at 44 to permit the dipper using the tray 3 to reach her position before the dipping trough. This gate or cutout portion of the chute is held in position by a weight 45 attached to a cord 46 one end of which is fastened at 47. This cord passes over a pulley 48 which is mounted upon a transverse brace which constitutes a portion of the gate. The purpose of the inclined chute is to make available at the front of the machine the trays used by the dipper using the pan 2. One assistant to the dippers can supply candy centers and remove the full trays from the delivery platform and transport them to storage racks without the necessity of passing around the machine. In this way production is considerably increased and the trays collected from the front or from one side of the mechanism.

The advantages of the dipping machine are readily obvious, as it eliminates cumbersome methods heretofore common in dipping candy. It also maintains the coating substance at a constant temperature during the dipping operation besides furnishing automatically trays for the dipped goods which move at a constant and uniform rate. The dipping is reduced to substantially a single operation. This can be done more rapidly and with more uniform results. The chilling of the coated product immediately after the dipping operation improves the character of the goods, as there is a satin-like finish or sheen to the product which is not found in goods dipped by the old method of a heated kettle without the chilling operation immediately following.

The drive control permits the mechanism to be individually regulated for the separate operators according to the speed at which they are capable of dipping. By means of this mechanism dipping operations have been speeded up more than three fold as compared with the dipping done by methods heretofore utilized.

I claim as my invention:

1. In a device of the character described, the combination with a rotatable driving shaft, of a cam fixed for rotation with said shaft, a bell crank member pivoted in the path of said cam for oscillation responsive to the rotation thereof, a driven wheel member, a counter weighted lever member pivoted relative to said wheel member, a friction shoe pivoted to said lever member for engagement with the periphery of said wheel member, link means interposed between said bell crank and lever members to oscillate said lever member in periodic engagement with said wheel member through the medium of said friction shoe, and adjustable means in the path of said bell crank to regulate the oscillatory throw thereof, thereby controlling the extent of motion imparted to said wheel member with each oscillation of said pivoted lever member.

2. In a device of the character described, the combination with a rotatable driving shaft, of means fixed to said shaft for rotation therewith, a bell crank pivoted in the path of said rotating means to impart oscillatory movement thereto, a driven wheel member, a counter-weighted lever member pivoted axially of said wheel member, a friction shoe pivoted to said lever member for periodic engagement of said wheel member responsive to the oscillation of said lever member in a predetermined direction, link means interposed between said bell crank and lever members to oscillate said lever member for carrying said friction shoe in engagement with the periphery of said wheel member to impart intermittent rotation thereto, said counterweighted lever serving to gravitate said friction shoe to a disengaged position, a rotatively mounted cam in the path of said bell crank to limit the oscillation thereof, and remote control means for positioning said cam so that the throw of said crank may be adjusted.

RUSSELL STOVER.